US011494890B2

(12) United States Patent
Sreeram et al.

(10) Patent No.: US 11,494,890 B2
(45) Date of Patent: Nov. 8, 2022

(54) IMAGE-DATA-BASED CLASSIFICATION OF VACUUM SEAL PACKAGES

(71) Applicant: Cryovac, LLC, Charlotte, NC (US)

(72) Inventors: Siddarth Sreeram, Charlotte, NC (US); Kalpit Shailesh Mehta, Charlotte, NC (US); Gregory E. McDonald, Simpsonville, SC (US); James A. Mize, Simpsonville, SC (US); Richard K. Watson, Fort Mill, SC (US)

(73) Assignee: Cryovac, LLC, Charlotte, NC (US)

( * ) Notice: Subject to any disclaimer, the term of this patent is extended or adjusted under 35 U.S.C. 154(b) by 64 days.

(21) Appl. No.: 17/058,696

(22) PCT Filed: May 30, 2019

(86) PCT No.: PCT/US2019/034486
§ 371 (c)(1),
(2) Date: Nov. 25, 2020

(87) PCT Pub. No.: WO2019/232111
PCT Pub. Date: Dec. 5, 2019

(65) Prior Publication Data
US 2021/0201471 A1 Jul. 1, 2021

Related U.S. Application Data

(60) Provisional application No. 62/679,070, filed on Jun. 1, 2018.

(51) Int. Cl.
*G06T 7/00* (2017.01)
*G06K 9/62* (2022.01)
(Continued)

(52) U.S. Cl.
CPC .......... *G06T 7/0004* (2013.01); *G06K 9/6256* (2013.01); *G06K 9/6269* (2013.01);
(Continued)

(58) Field of Classification Search
None
See application file for complete search history.

(56) References Cited

U.S. PATENT DOCUMENTS 8,284,248 B2   10/2012   Bourg et al.
9,275,308 B2    3/2016   Szegedy et al.
(Continued)

FOREIGN PATENT DOCUMENTS

CN   106530288 A    3/2017
CN   107067011 A    8/2017
KR   101789690 B1  10/2017

OTHER PUBLICATIONS

Peter Sayer, IBM's Watson is working as a quality assurance inspector on the manufacturing line, NetworkWorld, Apr. 25, 2017, IDG News Service—Paris Bureau Chief, IDG News Service.
(Continued)

*Primary Examiner* — Leon Flores
(74) *Attorney, Agent, or Firm* — Jon M. Isaacson

(57) ABSTRACT

Vacuum seal packages can be classified based on image data. Training image data is received that includes image data about first vacuum seal packages. Labels associated with the first vacuum seal packages are received, where each of the labels includes a state of one of the first vacuum seal packages. A trained classification model is developed based on the training image data and the received labels. Image data representative of a second vacuum seal package is received. The image data is inputted into the trained classification model, where the trained classification model is configured to classify a state of the second vacuum seal package based on the image data. The state of the second vacuum seal package is received from the trained classification model.

20 Claims, 9 Drawing Sheets

(51) Int. Cl.
G06N 3/04 (2006.01)
G06V 20/68 (2022.01)
(52) U.S. Cl.
CPC ...... *G06N 3/04* (2013.01); *G06T 2207/30128* (2013.01); *G06V 20/68* (2022.01)

(56) References Cited

U.S. PATENT DOCUMENTS

| | | | |
|---|---|---|---|
| 9,754,205 B1 | 9/2017 | Brestoff | |
| 2015/0264319 A1 | 9/2015 | Wood et al. | |
| 2017/0301108 A1 | 10/2017 | Estrada et al. | |
| 2017/0344860 A1 | 11/2017 | Sachs et al. | |
| 2017/0364771 A1 | 12/2017 | Pinheiro et al. | |
| 2019/0236772 A1* | 8/2019 | Cho | G06T 7/001 |
| 2019/0375167 A1* | 12/2019 | Liu | B29C 66/433 |

OTHER PUBLICATIONS

Manufacturing Quality Control Using Deep Learning & Computer Vision, retrieved from https://devmesh.intel.com/projects/manufacturing-quality-control-using-deep-learning-computer-vision on Mar. 28, 2018.

Yiqiang Z., et al., Manufacturing Package Fault Detection Using Deep Learning, published on Aug. 30, 2017, updated Dec. 7, 2017.

Kurt Marko, 6 Googlesque examples where machine learning provides business advantage, Mar. 30, 2017.

Prajod Vettiyattil, Smart Manufacturing With Apache Spark Streaming and Deep Leaning, ApacheCon Big Data Europe Nov. 2016, Seville, Spain.

S.A. Oyewole, et al., Product image classification using Eigen Colour feature with ensemble machine learning, Egyptian Informatics Journal, ICT and Society Research Group, Durban University of Technology, South Africa, 2017.

Emmanuel Benzaera, Categorizing images with deep learning into Elasticsearch, Jan. 20, 2016.

CS231n Convolutional Neural Networks for Visual Recognition, retrieved from http://cs231n.github.io/classification/ on Mar. 28, 2018.

Deep learning in the automotive industry: Applications and tools, retrieved from http://ieeexplore.ieee.org/document/7841045/?part=1 on Mar. 28, 2018.

Andrew Luckow, et al., Deep Learning in the Automotive Industry: Applications and Tools, https://doi.org/10.1109/BigData.2016.7841045, 2017.

Daniel Hankins, et al., Final Report—Development of Primal Cut Recognition and Localisation Software for use in Robotic Pick and Pack Systems, Jul. 2015.

Scott Technology, Pick and Pack—End Effector Gripper Development, Feb. 2016.

* cited by examiner

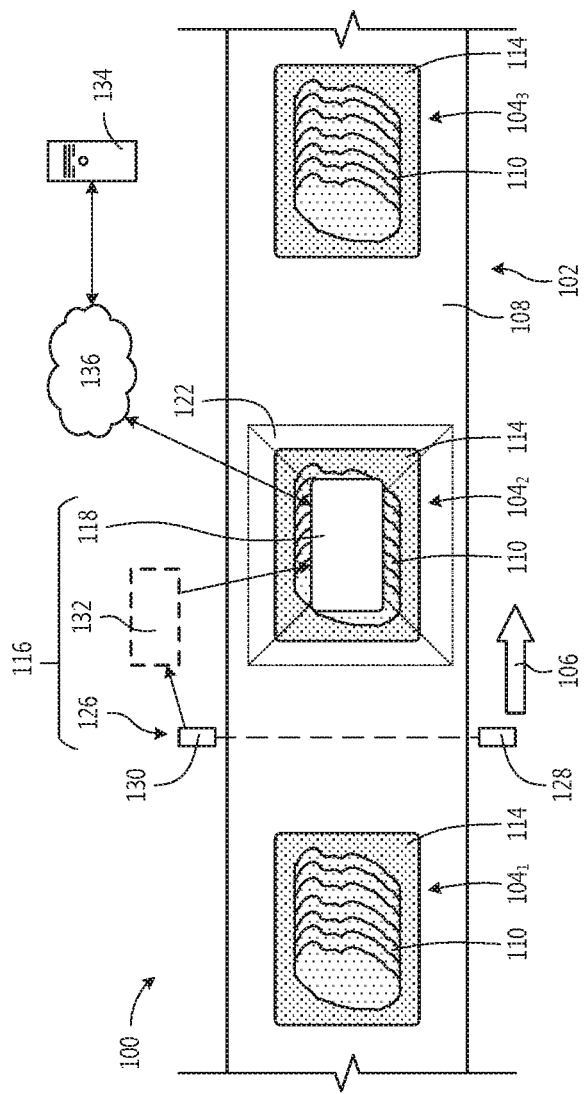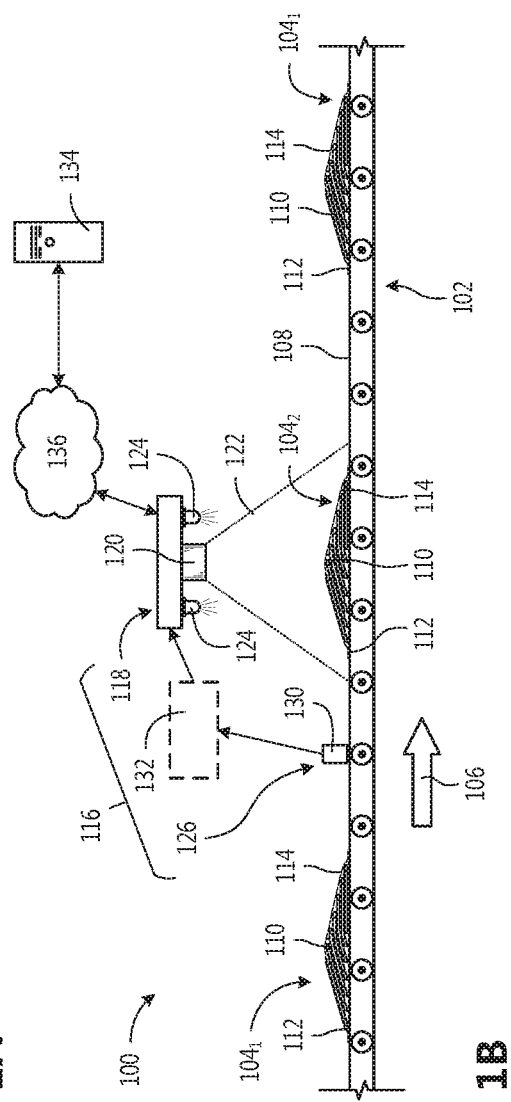

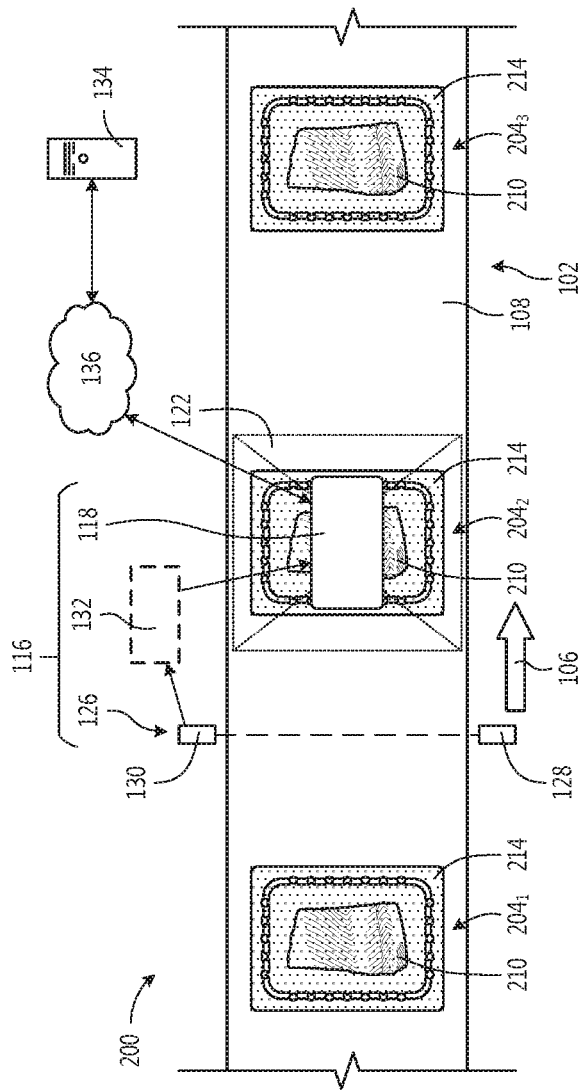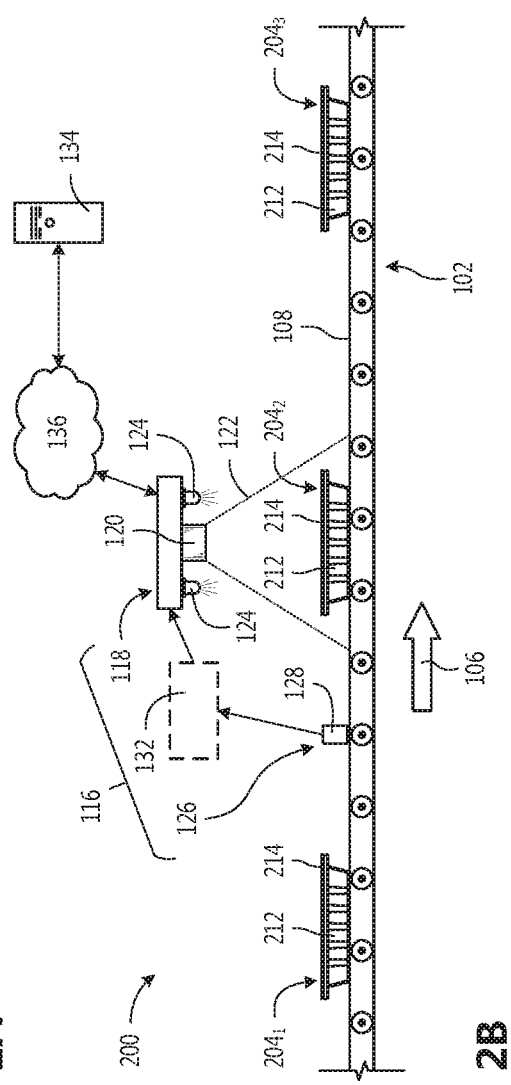

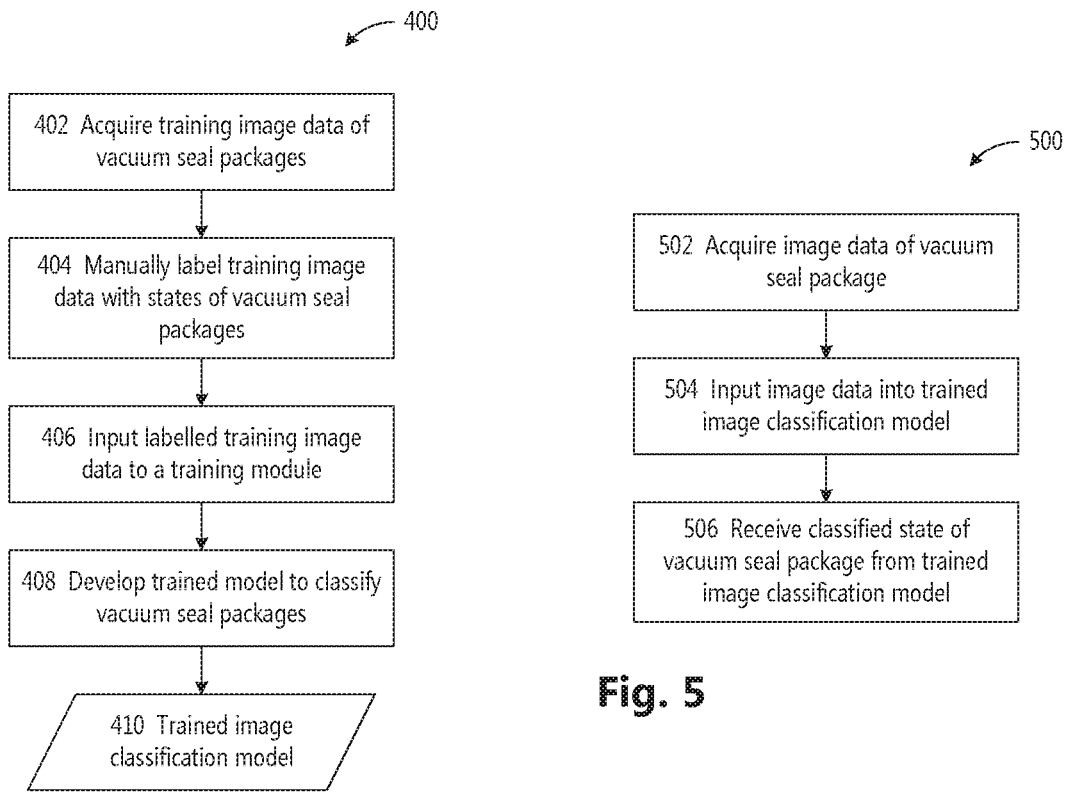
Fig. 4A
Fig. 5
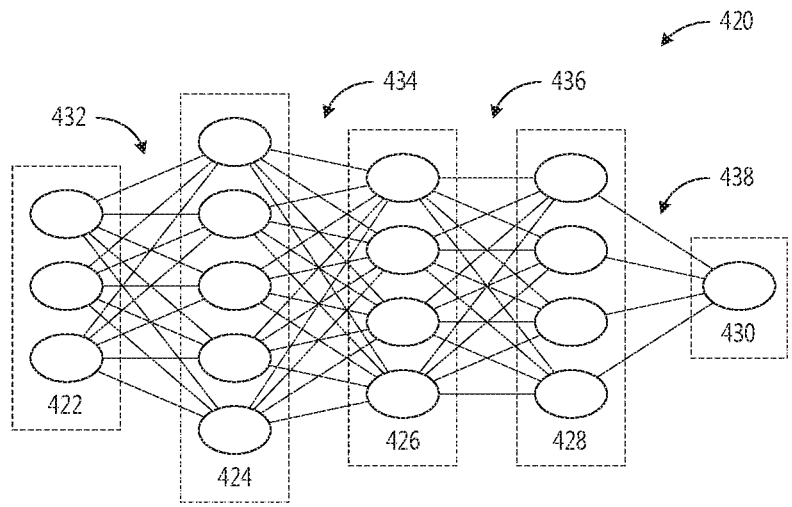
Fig. 4B

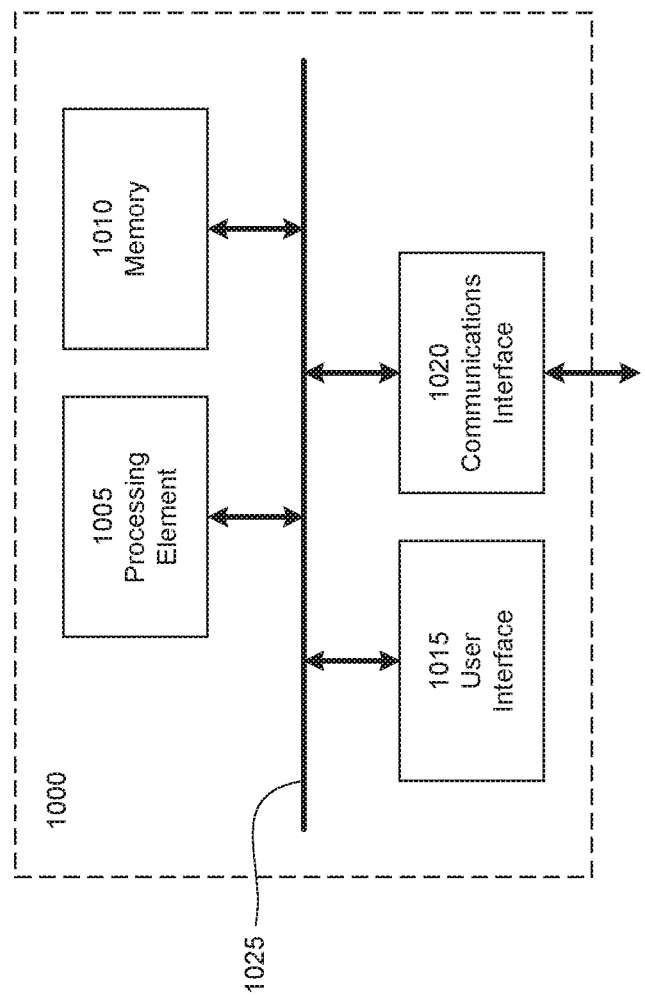

IMAGE-DATA-BASED CLASSIFICATION OF VACUUM SEAL PACKAGES

BACKGROUND

The present disclosure is in the technical field of classification of vacuum seal packages. More particularly, the present disclosure is directed to training and using models to classify vacuum seal packages based on image data of the vacuum seal packages.

Vacuum seal packaging has been used for packaging various food products, such as poultry, meat, and cheese. In some cases, food products are placed in heat sealable plastic bags. The air is then evacuated from inside the bag through a bag opening to collapse the bag around the contained food product and the bag opening is heat sealed to fully enclose the food product within the bag in a generally air-free environment. In certain implementations, the bag is a heat shrinkable bag and the bagged product is advanced through a hot water or hot air shrink tunnel to cause the bag to shrink around the food product. In other cases, food products are placed on trays with sealable film placed over the tray. The air is then evacuated from the tray through a tray or film opening to collapse the film over the food product in the tray and the opening is sealed to fully enclose the food product within the tray in a generally air-free environment.

Vacuum seal packaging is effective at extending the life of food products because of the generally air-free environment and because food product is sealed from outside conditions. However, when the vacuum seal packaging is defective, the benefits of vacuum seal packaging are lost. Under some circumstances, the food product inside of a defective vacuum seal package is exposed to conditions that allow the food product to spoil. In some cases, the food product then needs to be thrown out, resulting in costly waste. In other cases, the food product may be consumed, resulting in discomfort or illness to the consumer. Thus, it is advantageous to ensure that the vacuum seal packages in which food products are transported or sold are non-defective.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a system includes a transportation system, an image sensor system, and one or more computing devices. The transportation system is configured to transport vacuum seal packages. Each of the vacuum seal packages includes a food product. The image sensor system includes an image data capture system. The image data capture system is arranged to capture image data of individual vacuum seal packages as the vacuum seal packages are transported by the transportation system. The one or more computing devices are communicatively coupled to the image sensor system and configured to receive the image data from the image sensor system. The one or more computing devices include instructions that, in response to execution of the instructions by the one or more computing devices, cause the one or more computing devices to classify a state of one or more of the vacuum seal packages based on the image data using a trained classification model and output the state of the one or more of the vacuum seal packages after classification of the state of the one or more of the vacuum seal packages.

In one example, the trained classification model includes a decision-making process configured to receive an input that includes the image data and to output an output that includes the state of the one or more of the vacuum seal packages. In another example, the decision-making process is a multilayer neural network, where the multilayer neural network includes an input layer includes the input, an output layer including the output, and at least one hidden layer between the input layer and the output layer. In another example, the image sensor system further includes a presence detector system configured to detect one of the vacuum seal packages on the transport system.

In another example, the image sensor system further includes a controller, the controller is configured to receive a signal from the presence detector system indicating the detected one of the vacuum seal packages, and the controller is further configured to control a timing of the image sensor system during at least a portion of a time that the image sensor system obtains the image data of the detected one of the vacuum seal packages. In another example, the transportation system includes a conveyor belt, and the controller is further configured to control the timing of the image sensor system based in part on a speed of the conveyor belt. In another example, the classified state of the one or more of the vacuum seal packages includes an indication of whether the one or more of the vacuum seal packages is defective, is non-defective, or has a particular defect. In another example, the classified state of the one or more of the vacuum seal packages further includes a degree of certainty as to whether the vacuum seal package is defective, is non-defective, or has a particular defect. In another example, the one or more computing devices are configured to output the state of the one or more of the vacuum seal packages via by at least one of providing an indication of the state to a user interface output device, communicating the state via a communication interface to an external device, or storing the state in a local database.

In another embodiment, computer-readable medium have instructions embodied thereon. The instructions include instructions that, in response to execution by one or more computing devices, cause the one or more computing devices to perform a method. The method includes receiving training image data, where the training image data including image data about a plurality of first vacuum seal packages. The method further includes receiving labels associated with the plurality of first vacuum seal packages, where each of the labels includes a state of one of the plurality of first vacuum seal packages. The method further includes developing a trained classification model based on the training image data and the received labels and receiving image data representative of a second vacuum seal package. The method further includes inputting the image data into the trained classification model, where the trained classification model is configured to classify a state of the second vacuum seal package based on the image data, and receiving the state of the second vacuum seal package from the trained classification model.

In one example, the state of the second vacuum seal package includes an indication of whether the second vacuum seal package is defective, is non-defective, or has a particular defect. In another example, the state of the second vacuum seal package further includes a degree of certainty as to whether the second vacuum seal package is defective, is non-defective, or has a particular defect. In another example, the instructions further include instructions that, in response to execution by the one or more computing devices, further cause the one or more computing devices to determine, based on the degree of certainty, whether a confidence level of the state of the second vacuum seal package is low and, in response to determining that the confidence level of the state of the second vacuum seal package is low, to flag the second vacuum seal package for manual classification. In another example, the instructions further include instructions that, in response to execution by the one or more computing devices, further cause the one or more computing devices to receive a user input of a manual classification of the second vacuum seal package and further develop the trained classification model based on the image data and the manual classification of the second vacuum seal package.

In another example, the trained classification model includes a detection decision-making process and a classification decision-making process. In another example, the detection decision-making process is configured to process the image data to produce processed image data. In another example, the detection decision-making process is configured to process the image data to produce processed image data at least by cropping an image in the image data so that the second vacuum seal package remains in the cropped image. In another example, the detection decision-making process is further configured to detect a presence of the second vacuum seal package in the image data. In another example, the classification decision-making process is configured to classify the state of the second vacuum seal package based on the processed image data. In another example, the instruction that cause the one or more computing devices to develop a trained classification model include instructions that, in response to execution by the one or more computing devices, cause the one or more computing devices to train the classification model for a plurality of learning parameters and determine one or more model parameters based on the plurality of learning parameters. In another example, the instruction that cause the one or more computing devices to develop a trained classification model further include instructions that, in response to execution by the one or more computing devices, cause the one or more computing devices to create the trained classification model based on the one or more model parameters. In another example, the image data representative of the second vacuum seal package includes a plurality of forms of image data. In another example, the plurality of forms of image data includes at least two images of the second vacuum seal package, and the trained classification model is configured to classify the state of the second vacuum seal package based on the image data in part by separately classifying a state of each of the at least two images of the second vacuum seal package.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein:

FIGS. 1A and 1B depict top and side views of a system for classifying the state of vacuum seal packages, in accordance with the embodiments described herein;

FIGS. 2A and 2B depict top and side views of the system shown in FIGS. 1A and 1B with an example of classifying the state of another type of vacuum seal packages, in accordance with the embodiments described herein;

FIG. 4A depicts an embodiment of a method of developing a trained image classification model, in accordance with the embodiments described herein;

FIG. 4B depicts an example of a neural network that is a multilayer neural network, in accordance with the embodiments described herein;

FIG. 5 depicts an embodiment of a method of using a trained image classification model to classify a state of a vacuum seal package, in accordance with the embodiments described herein;

FIG. 10 depicts a block diagram of an embodiment of a computing device, in accordance with the embodiments described herein.

DETAILED DESCRIPTION

Figure 3:
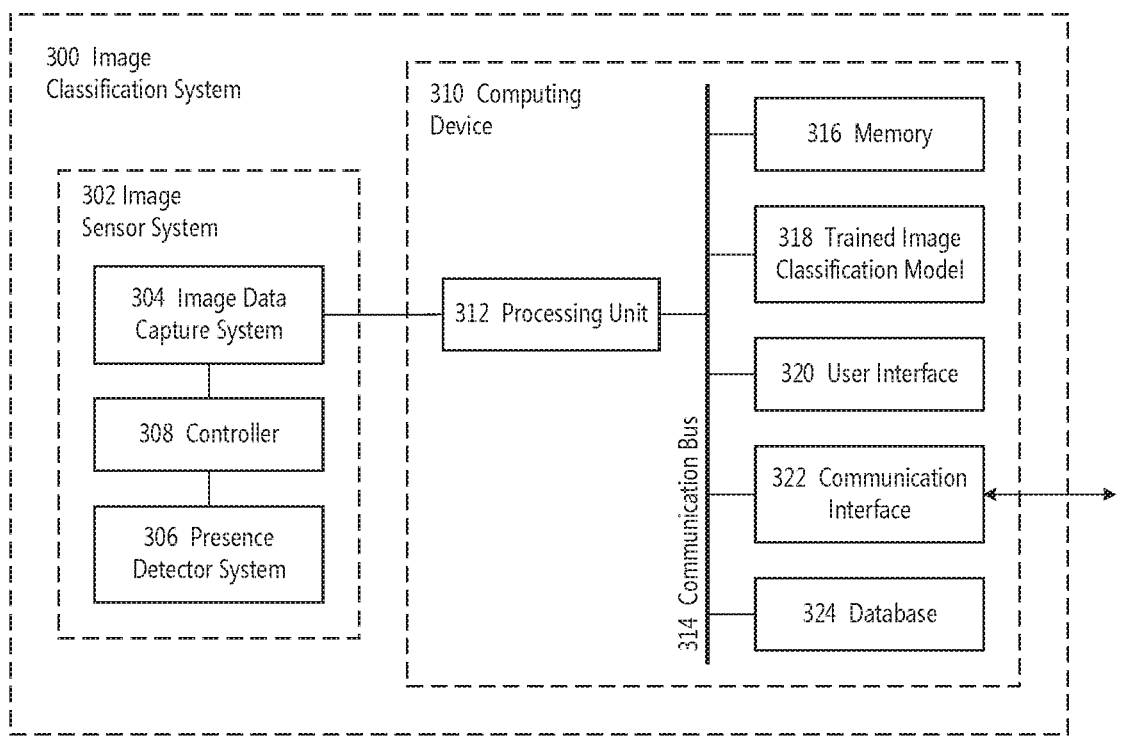
FIG. 3 depicts a schematic diagram of an embodiment of an image classification system for classifying vacuum seal packages based on image data of the vacuum seal packages, in accordance with the embodiments described herein.

To ensure that the vacuum seal packages in which food products are transported or sold are non-defective, the vacuum seal packages can be inspected and labelled as defective or non-defective. However, manual inspection and labelling can be time-consuming and very costly. In addition, manual inspection and labelling of vacuum seal package is prone to human error. In some instances, inspectors who do not have sufficient training or experience can frequently falsely identify defective packages as non-defective, leading to defective packages being used to transport and sold, and falsely identify non-defective packages as defective, leading to non-defective packages and food product being wasted.

One solution may be to automatically label vacuum seal packages as defective or non-defective, such as by a computer labelling the vacuum seal packages. Past attempts at automatic labelling including evaluating images of the vacuum seal packages for discontinuities in the vacuum seal packages, such as holes in the film, lack of sealing at film seams, and the like. However, these attempts had limited success because of the intricacies of looking for such discontinuities in images. In one example, a hole in the film may be as small as a pin head that is not easily detectible in image of a vacuum seal package. In another example, the film used in a vacuum seal package may be transparent, which may also be difficult to detect in an image of a vacuum seal package. In addition, vacuum seal packages typically have physical features that make it difficult for an image to show the entire surface area of the film, such as folds and creases in the film, contours around the food product, and the like.

The present disclosure describes embodiments of systems and methods of classifying vacuum seal packages based on image data using trained models. A classification model can be trained to classify a vacuum seal package based on image data of the vacuum seal package. To train the trained model, training image data is captured of a number of vacuum seal packages (e.g., hundreds of vacuum seal packages, thousands of vacuum seal packages, or more). The training image data is manually labelled to classify a state (e.g., defective or non-defective) of the vacuum seal packages in the training image data. The labelled training image data is used to develop the trained model to include a decision-making process (e.g., a decision tree, a neural network, etc.) that is optimized to classify the vacuum seal packages in the training image data. After the model is trained, new image data of a vacuum seal package is provided to the trained model and the trained model classifies a state of the vacuum seal package represented in the new image data. While the trained model does not necessarily "look" for discontinuities in the image data, the trained model can be much more accurate that manual classification and other forms of automatic classification. Examples and variations of these embodiments and other embodiments of training and using trained models are described herein.

Depicted in FIGS. 1A and 1B are top and side views of a system 100 for classifying the state of vacuum seal packages. The system 100 includes a transportation system 102 configured to transport vacuum seal packages $104_1$, $104_2$, and $104_3$ (collectively vacuum seal packages 104) in a transportation direction 106. In the depicted embodiment, the transportation system 102 includes a conveyor belt 108 on which the vacuum seal packages 104 are located. In the depicted embodiment, only a portion of the transportation system 102 is depicted; additional vacuum seal packages may be located on portions of the transportation system 102 that are not depicted in FIGS. 1A and 1B.

In the depicted embodiment, each of the vacuum seal packages 104 includes a food product 110. The food product 110 is vacuum sealed between a backing film 112 and a cover film 114. In some embodiments, the backing and cover films 112 and 114 are made from the same types of film. In other embodiments, the backing and cover films 112 and 114 are made from different types of film. In some embodiments, the backing and cover films 112 and 114 are heat sealed together. In other embodiments, the backing and cover films 112 and 114 are adhered together. In some embodiments, the backing and cover films 112 and 114 include an easy open feature that enables consumers to open the vacuum seal packages 104 without the use of tools (e.g., without the use of scissors).

The system 100 includes an image sensor system 116 that is configured to obtain image data of the vacuum seal packages 104. In some embodiments, the image sensor system 116 is configured to obtain image data of the vacuum seal packages 104 as the vacuum seal packages 104 are transported by the transportation system 102 in the transportation direction 106. In some embodiments, the image data obtained by the image sensor system 116 of the vacuum seal packages 104 includes one or more images, one or more videos, or any combination thereof.

In the depicted embodiment, the image sensor system 116 includes an image data capture system 118. The image data capture system 118 includes a camera 120 configured to obtain image data within a field 122. In some embodiments, the camera 120 includes one or more of a semiconductor charge-coupled device (CCD), an active pixel sensor in a complementary metal-oxide-semiconductor (CMOS) integrated circuit, an active pixel sensor in N-type metal-oxide-semiconductor (NMOS, Live MOS) integrated circuit, a three-dimensional (3D) sensor, a line scanner, or any other digital image sensor, or any combination thereof. In the depicted embodiment, the camera 120 is arranged so that the field 122 is directed toward a portion of the transportation system 102. In the instance depicted in FIGS. 1A and 1B, the vacuum seal package $104_2$ is located on the conveyor belt 108 within the field 122 of the camera 120. With the vacuum seal package $104_2$ in that location, the camera 120 is configured to obtain one or more images of the vacuum seal package $104_2$, one or more videos of the vacuum seal package $104_2$, or a combination of images and videos of the vacuum seal package $104_2$.

In some embodiments, the image data capture system 118 also includes one or more electromagnetic energy sources 124 configured to emit electromagnetic energy into the field 122 of the camera 120. In some embodiments, the one or more electromagnetic energy sources 124 are configured to emit electromagnetic energy in one or more of an X-ray range of wavelengths (i.e., electromagnetic energy having a wavelength between about 0.001 nm and about 10 nm), an ultraviolet range of wavelengths (i.e., electromagnetic energy having a wavelength between about 10 nm and about 400 nm), a visible range of wavelengths (i.e., electromagnetic energy having a wavelength between about 380 nm and about 760 nm), or an infrared range of wavelengths (i.e., electromagnetic energy having a wavelength between about 750 nm and about 1 mm). In some embodiments, the range(s) of wavelengths of the electromagnetic energy emitted by the electromagnetic energy sources 124 is determined based on a desired characteristic of the image data obtained by the camera 120.

In the depicted embodiment, the image sensor system 116 also includes a presence detector system 126. In the depicted embodiment, the presence detector system 126 is a photoelectric sensor (e.g., a photo eye). More specifically, the depicted embodiment of the presence detector system 126 is a through-beam photoelectric sensor that includes a transmitter 128 and a detector 130. The transmitter 128 is configured to emit electromagnetic energy (e.g., infrared electromagnetic energy, visible electromagnetic energy, etc.) toward the detector 130. The detector 130 is configured to detect the electromagnetic energy emitted by the transmitter 128. If the detector 130 fails to detect the electromagnetic energy, the detector 130 can generate a signal indicative of an object passing between the transmitter 128 and the detector 130. In other embodiments, the presence detector system 126 may be a through-beam photoelectric sensor that includes a transceiver in place of the detector 130 and a reflector in place of the transmitter 128. The transceiver emits electromagnetic energy toward the reflector, which reflect the electromagnetic energy back to the transceiver. When any break in the electromagnetic energy is detected by the transceiver, the transceiver can generate a signal indicative of an object passing between the transceiver and the reflector. In other embodiments, the presence detector system 126 may be a diffusing photoelectric sensor that is located on only one side of the transportation system 102 and is capable of detecting the presence of an object on the conveyor belt 108.

In the depicted embodiment, the presence detector system 126 is communicatively coupled to a controller 132. When the presence detector system 126 detects the presence of an object on the transportation system 102, the presence detector system is configured to communicate a signal to the controller 132 indicative of the presence of the object. The controller 132 is communicatively coupled to the image data capture system 118. The controller 132 is configured to cause the image data capture system 118 to obtain image data of one of the vacuum seal packages 104. In the embodiment shown in FIGS. 1A and 1B, the controller 132 is external to both the image data capture system 118 and the presence detector system 126. In this case, the controller 132 may be a computing device in communication with each of the image data capture system 118 and the presence detector system 126. In other embodiments, the controller 132 may be integrated with either the image data capture system 118 or the presence detector system 126. In some embodiments, the controller 132 is capable of controlling the timing of the image data capture system 118 so that one of the vacuum seal packages 104 is in the field 122 of the camera 120 when the image data capture system 118 obtains the image data.

In one example, as the transportation system 102 continues to move the vacuum seal packages 104 in the transportation direction 106, the presence detector system 126 will detect the presence of the vacuum seal package $104_1$ as the vacuum seal package $104_1$ is moved between the transmitter 128 and the detector 130, and the detector 130 sends a signal to the controller 132 indicative of the presence of the vacuum seal package $104_1$. As the vacuum seal package $104_1$ continues to move in the transportation direction 106, the controller 132 causes the image data capture system 118 to obtain image data of the vacuum seal package $104_1$. In some embodiments, the controller 132 controls the timing of the image data capture system 118 so that the vacuum seal package $104_1$ is within the field 122 if the camera 120 during at least a portion of the time that the camera obtains the image data of the vacuum seal package $104_1$.

In the depicted embodiment, the image sensor system 116 is communicatively coupled to a computing device 134 via a network 136. In some embodiments, the computing device 134 can be a remote computing device. As used herein, the term "remote computing device" refers to a computing device that is located sufficiently far from a location that a user at the location cannot interact directly with the remote computer device. In other embodiments, the computing device 134 can be a local computing device. As used herein, the term "local computing device" refers to a computing device that is located at a location such that a user at the location can interact directly with the local computer device. The computing device 134 may be any type of computing device, such as a server, a desktop computer, a laptop computer, a cellular telephone, a tablet, and the like.

In some embodiments, the network 136 is a wired network, such as a Ethernet local area network (LAN), a coaxial cable data communication network, an optical fiber network, a direct wired serial communication connection (e.g., USB), or any other type of wired communication network. In some embodiments, the network 136 is a wireless network, such as a WiFi network, a radio communication network, a cellular data communication network (e.g., 4G, LTE, etc.), a direct wireless communication connection (e.g., Bluetooth, NFC, etc.), or any other type of wireless communication network. In some embodiments, the network 136 is a combination of wired and wireless networks. In some embodiments, the network 136 may be a private network (e.g., a private LAN), a public network (e.g., the internet), or a combination of private and/or public networks.

In some embodiments, the image sensor system 116 is configured to send image data obtained of the vacuum seal packages to the computing device 134 via the network 136. In the depicted embodiment, the image data capture system 118 is configured to send the image data to the computing device 134 via the network 136. The computing device 134 is configured to classify a state of each of the vacuum seal packages 104 based on the image data of each of the vacuum seal packages 104 received from the image sensor system 116. In some embodiments, the state of a vacuum seal package classified by the computing device 134 includes a determination of whether the vacuum seal package is defective or non-defective. In some embodiments, the state of a vacuum seal package classified by the computing device 134 includes either an indication that the vacuum seal package is non-defective or an indication of at least one of a number of possible defects of the vacuum seal package. In some embodiments, the state of a vacuum seal package classified by the computing device 134 includes (1) an indication of at least one of vacuum seal package being defective, the vacuum seal package being non-defective, or a defect of the vacuum seal package, and (2) an indication of a degree of certainty as to the indication of at least one of the vacuum seal package being defective, the vacuum seal package being non-defective, or a defect of the vacuum seal package. Examples of how the computing device 134 may classify a state of the vacuum seal packages 104 based on image data are discussed below.

In some embodiments described herein, the state of a vacuum seal package can include a determination of a particular defect of the vacuum seal package. Examples of possible defects of vacuum seal packages include: tears in a bag that makes up the vacuum seal package, a low vacuum condition of the vacuum seal package, an incorrect product located inside the vacuum seal package, a leaking vacuum seal package (e.g., that is caused and/or defected by wrinkling, pin holes, seal failures, contamination, etc.), an oversized vacuum seal package for the size of the product in the vacuum seal, an incorrect establishment number, a misplaced label on the vacuum seal package, defective printing on the vacuum seal package, a hanging tail on the vacuum seal package, leaking vacuum seal packages caused by edge tears, a foreign object in the vacuum seal package, incorrect styling on the vacuum seal package (where styling indicates a position and/or orientation of objects inside the vacuum seal package), or any other type of defect.

Depicted in FIGS. 2A and 2B are top and side views of the system 100 in an example of classifying the state of another type of vacuum seal packages. In FIGS. 2A and 2B, the system 100 includes the transportation system 102 and the image sensor system 116. The transportation system 102 is configured to transport vacuum seal packages $204_1$, $204_2$, and $204_3$ (collectively vacuum seal packages 204) on the conveyor belt 108 in the transportation direction 106. In the depicted embodiment, each of the vacuum seal packages 204 includes a food product 210. The food product 210 is vacuum sealed between a tray 212 and a cover film 214. In some embodiments, the tray 212 is a rigid tray configured to substantially hold its form before and after the vacuum sealing. In some embodiments, the cover film 214 is heat sealed to the tray 212. In other embodiments, the cover film 214 is adhered to the tray 212. In some embodiments, the cover film 214 includes an easy open feature that enables consumers to open the vacuum seal packages 204 without the use of tools (e.g., without the use of scissors).

The system 100 also includes the image sensor system 116 that is configured to obtain image data of the vacuum seal packages 204. In one example, as the transportation system 102 moves the vacuum seal packages 204 in the transportation direction 106, the presence detector system 126 will detect the presence of the vacuum seal package $204_1$ as the vacuum seal package $204_1$ is moved between the transmitter 128 and the detector 130, and the detector 130 sends a signal to the controller 132 indicative of the presence of the vacuum seal package 204$_1$. As the vacuum seal package 204$_1$ continues to move in the transportation direction 106, the controller 132 causes the image data capture system 118 to obtain image data of the vacuum seal package 204$_1$. In some embodiments, the controller 132 controls the timing of the image data capture system 118 so that the vacuum seal package 204$_1$ is within the field 122 if the camera 120 during at least a portion of the time that the camera obtains the image data of the vacuum seal package 204$_1$.

In some embodiments, the controller 132 is configured to control the timing of the image data capture system 118 based on an expected size or shape of the vacuum seal packages. For example, the controller 132 may take into account a distance between the middle of the vacuum seal packages 204 in the transportation direction 106 and a position on the vacuum seal packages 204 that will first be detected by the presence detector system 126. This allows the image data capture system 118 to cause the image data capture system 118 to capture image data of the vacuum seal packages 204 when the vacuum seal packages 204 are within the field 122 of the camera 120. It will be noted that the controller 132 may be adjusted when a different type of vacuum seal packaging is transported by the transportation system 102, such as when vacuum seal packages 104 are transported by the transportation system 102 in place of the vacuum seal packages 204 shown in FIGS. 2A and 2B. In other embodiments, the controller 132 may take into account a size of the vacuum seal packages 204. For example, the controller 132 may estimate a width of the vacuum seal packages 204 based on an amount of time that the presence of the vacuum seal packages 204 is detected by the presence detector system 126. In some embodiments, the controller 132 may take into account other aspects of the system 100, such as a speed of the conveyor belt 108, a shutter speed of the camera 120, or any other characteristics of the system 100.

As mentioned above, the computing device 134 may classify a state of the vacuum seal packages, such as vacuum seal packages 104 and vacuum seal packages 204, based on image data of the vacuum seal packages. Depicted in FIG. 3 is a schematic diagram of an embodiment of an image classification system 300 for classifying vacuum seal packages based on image data of the vacuum seal packages. The image classification system 300 includes an image sensor system 302 and a computing device 310. In the embodiments of the systems 100 and 200, the image sensor system 302 can be the image sensor system 116 and the computing device 310 can be the computing device 134.

The image sensor system 302 configured to provide the computing device 310 with image data of the vacuum seal packages. The image sensor system 302 includes an image data capture system 304 configured to capture the image data (e.g., take a picture or take video) of the vacuum seal packages. The image sensor system 302 also includes a presence detector system 306 configured to detect a presence of individual vacuum seal packages. For example, the presence detector system 306 may detect a presence of individual vacuum seal packages as the vacuum seal packages are transported by a transportation system. The image sensor system 302 also includes a controller 308 configured to control a timing of the image data capture by the image data capture system 304 based on signals from the presence detector system 306. In the embodiments of the systems 100 and 200, the image data capture system 304, the presence detector system 306, and the controller 308 may be the image data capture system 118, the presence detector system 126, and the controller 132, respectively.

The computing device 310 includes a processing unit 312, such as a central processing unit (CPU). The processing unit is communicatively coupled to a communication bus 314. In the depicted embodiment, the computing device 310 also includes memory 316 configured to store data at the direction of the processing unit 312. In the depicted embodiment, the computing device 310 also includes a trained image classification model 318 configured to classify a vacuum seal package based on image data of the vacuum seal package. Embodiments of trained models and training models are discussed in greater detail below. In the depicted embodiment, the computing device 310 also includes a user interface 320 that includes one or more devices that are capable of receiving inputs from a user into the computing device 310 and/or outputting outputs from the computing device 310. In the depicted embodiment, the computing device 310 also includes a communication interface 322 that is capable of communicating with external computing devices and/or networks. In the depicted embodiment, the computing device 310 also includes a database 324 that is local to the computing device 310. Each of the memory 316, the trained image classification model 318, the user interface 320, the communication interface 322, and the database 324 is communicatively coupled to the communication bus 314 so that the processing unit 312, the memory 316, the trained image classification model 318, the user interface 320, the communication interface 322, and the database 324 are capable of communicating with each other.

As noted above, the image sensor system 302 is configured to provide the computing device 310 with image data of the vacuum seal packages. The image data from the image sensor system 302 to the computing device 310 may be communicated via one or more wired connections (e.g., a serial communication connection), wireless connections (e.g., a WiFi connection), or a combination of wired and wireless connections. Upon the computing device 310 receiving image data for a vacuum seal package from the image sensor system 302, the processing unit 312 may cause the image data to be stored in the memory 316. The processing unit 312 may then instruct the trained image classification model 318 to classify a state of the vacuum seal package based on the image data stored in the memory 316. In some embodiments, the classified state of the vacuum seal package by the trained image classification model 318 may include an indication that the vacuum seal package is defective, is non-defective, or has a particular defect and/or an indication of a degree of certainty as to whether the vacuum seal package is defective, is non-defective, or has a particular defect. The processing unit 312 may then cause the classification from the trained image classification model 318 to be stored in the memory 316.

After the image data is classified, the processing unit 312 may be configured to output the classification of the vacuum seal package. In some embodiments, the processing unit 312 may output the classification of the vacuum seal package by one or more of outputting the classification of the vacuum seal package to a user via the user interface 320, communicating the classification of the vacuum seal package to an external device via the communications interface 322, or locally storing the classification of the vacuum seal package in the database 324. In some cases, outputting the classification includes outputting the classification only. In other cases, outputting the classification includes outputting, with the classification, an identification of the vacuum seal package, the image data associated with the vacuum seal package, a processed version of the image data associated with the vacuum seal package, metadata associated with the image data, or any other information about the vacuum seal package and/or the classification of the image data. In some embodiments where the classification of the vacuum seal package to an external device via the communications interface 322, the classification can be communicated from the communications interface 322 to an external computing device (e.g., a "cloud"-based server) that is configured to collect data about operations and to analyze the data to improve performance (sometimes referred to as an "internet of things" (IoT) service or interface). In some embodiments where the classification of the vacuum seal package to an external device via the communications interface 322, the classification can be communicated from the communications interface 322 to a portion of a transportation system (e.g., the transportation system 102) to route the vacuum seal package based on the classification.

As noted above, the trained image classification model 318 may be developed to classify image data of vacuum seal packages. Depicted in FIG. 4A is an embodiment of a method 400 of developing a trained image classification model. At block 402, training image data of vacuum seal packages is obtained. In some embodiments, the training image data includes images and/or video of vacuum seal packages having a known state. In some embodiments, the image data capture system used to obtain the training image data is the same as the image data capture system that will be used to obtain image data of vacuum seal packages of unknown state after the trained image classification model is created. At block 404, the training image data is manually labelled with the states of the vacuum seal packages in the training image data. For example, a user can manually input a state (e.g., the vacuum seal package is defective, is non-defective, or has a particular defect) for each image and/or video of a vacuum seal package in the image data. Manually labelling the image data may include physically testing the vacuum seal packages to determine whether individual vacuum seal packages are sealed or leak and then applying a label to the image data based on the results of the physical testing. In some embodiments, the number of vacuum seal packages represented in the training image data is in a range of tens of vacuum seal packages, hundreds of vacuum seal packages, thousands of vacuum seal packages, or more. At these numbers, the manual labelling process of the training image data may be a labor-and time-intensive process. At block 406, the labelled training image date is input into a training module. In some embodiments, the training model is a machine learning module, such as a "deep learning" module. Deep learning is a subset of machine learning that generates models based on training data sets provided to it.

At block 408, the trained model is developed to classify vacuum seal packages. In some embodiments, as the trained model is developed, one or more learning algorithms are used to create the trained model based on the labelled states of the vacuum seal packages in the training image data. In some embodiments, the trained model is created based on input vectors which are indicative of a characteristic of the vacuum seal packages. In one example, the input vector may be the "looseness" of the vacuum seal package, with looser vacuum seal packages defined as defective. In one example, the looseness above a particular threshold may indicate a loss of vacuum within the vacuum seal package. In other examples, the input vectors may be colors in the visible spectrum, detection of an additive in a film of the vacuum seal package using a non-visible electromagnetic energy (e.g., ultraviolet, infrared), the presence and numbers of film folds, or any other number of possible input vectors. The use of input vectors for training may help the trained model identify defective vacuum seal packages without identifying the underlying cause. For example, a vacuum seal package may have a small pinhole that would be difficult to detect using image data captured as the vacuum seal package is being moved on a transportation system. The use of the input vectors allows the trained model to detect that the vacuum seal package is defective without the need to identify the small pinhole itself. After the input vectors are modeled, a trained model can be developed as a decision-making process based on a number of the input vectors. Examples of decision-making processes include decision trees, neural networks, and the like. In some embodiments, the decision-making process of the trained model is based on a determination of an acceptable arrangement of the input vectors in the decision-making process.

The result of the development of the trained model in block 408 is the trained model depicted at block 410. The trained model can be used during normal operation (e.g., operation that is not used to train to the trained model) to identify states of vacuum seal packages. In some embodiments, the trained model includes a neural network that has a number of layers. Depicted in FIG. 4B is an example of a neural network 420 that is a multilayer neural network. In the depicted embodiment, the neural network 420 includes a first layer 422 with three input nodes, a second layer 424 with five hidden nodes, a third layer 426 with four hidden nodes, a fourth layer 428 with four hidden nodes, and a fifth layer 430 with one output node. The neural network 420 also includes a first set of connections 432 between each pair of the three input nodes in the first layer and the five input nodes in the second layer 424, a second set of connections 434 between each pair of the five input nodes in the second layer 424 and the four hidden nodes in the third layer 426, a third set of connections 436 between each pair of the four hidden nodes in the third layer 426 and the four hidden nodes in the fourth layer 428, and a fourth set of connections 438 between each pair of the four hidden nodes in fourth layer 428 and the output node in the fifth layer 430. In some embodiments, the input nodes represent inputs into the trained models (e.g., image data, metadata associated with the image data, etc.), one or more of the hidden nodes (e.g., one of the layers of hidden nodes) may represent one of the input vectors determined during the development of the model, and the output node represents the determined state of the vacuum seal package.

Depicted in FIG. 5 is an embodiment of a method 500 of using a trained image classification model to classify a state of a vacuum seal package. At block 502, image data of the vacuum seal package is acquired. The image data of the vacuum seal package may be obtained by an image data capture system, such as an image data capture system in an image sensor system. In some embodiments, the image data of the vacuum seal package is obtained while the vacuum seal package is being transported by a transport system.

At block 504, the image data of the vacuum seal package is input into a trained image classification model. The trained image classification model may be operating on a computing device, such as a local computing device at the image data capture system or a remote computing device from the local computing device. The trained image classification model is configured to classify a state of the vacuum seal package based on the image data. At block 506, a classification of a state of the vacuum seal package is received from the trained image classification model. In some embodiments, the classified state includes an indication that a vacuum seal package is defective, is non-defective, or has a particular defect, and/or an indication of a degree of certainty as to whether the vacuum seal package is defective, is non-defective, or has a particular defect. In some embodiments, the classified state is received by one or more of displaying the classification on a user interface output device, communicating the classification via a communication interface to one or more external devices, or storing the classification in a database. In some embodiments, the received classification the vacuum seal package includes one or more of the classified state or the vacuum seal package or a degree of certainty of the classified state of the classified state or the vacuum seal package. In one specific example, the state is communicated to a routing system that is configured to route vacuum seal packages on a transportation system based on their states, such as routing defective packages to a location for repackaging and/or waste disposal.

As noted above, the method 400 is used to obtain the trained classification model at block 410 and then the trained classification model can be used in method 500 to classify vacuum seal packages. In some embodiments, the training image data acquired at block 402 is image data of a particular type of vacuum seal packages and the image data acquired at block 502 is image data of the same type of vacuum seal packages. In one example, the training image data acquired at block 402 is image data of the vacuum seal packages 104 and the image data acquired at block 502 is image data of the same type of vacuum seal packages as the vacuum seal packages 104. In some embodiments, the training image data acquired at block 402 is image data of a particular type of vacuum seal packages and the image data acquired at block 502 is image data of a different type of vacuum seal packages. In one example, the training image data acquired at block 402 is image data of the vacuum seal packages 104 and the image data acquired at block 502 is image data of the vacuum seal packages 204. Even though the vacuum seal packages 204 are a different type from the vacuum seal packages 104, the trained classification model using the training image data from the vacuum seal packages 104 may be able to classify states of the vacuum seal packages 204 with sufficient accuracy.

Figure 6:
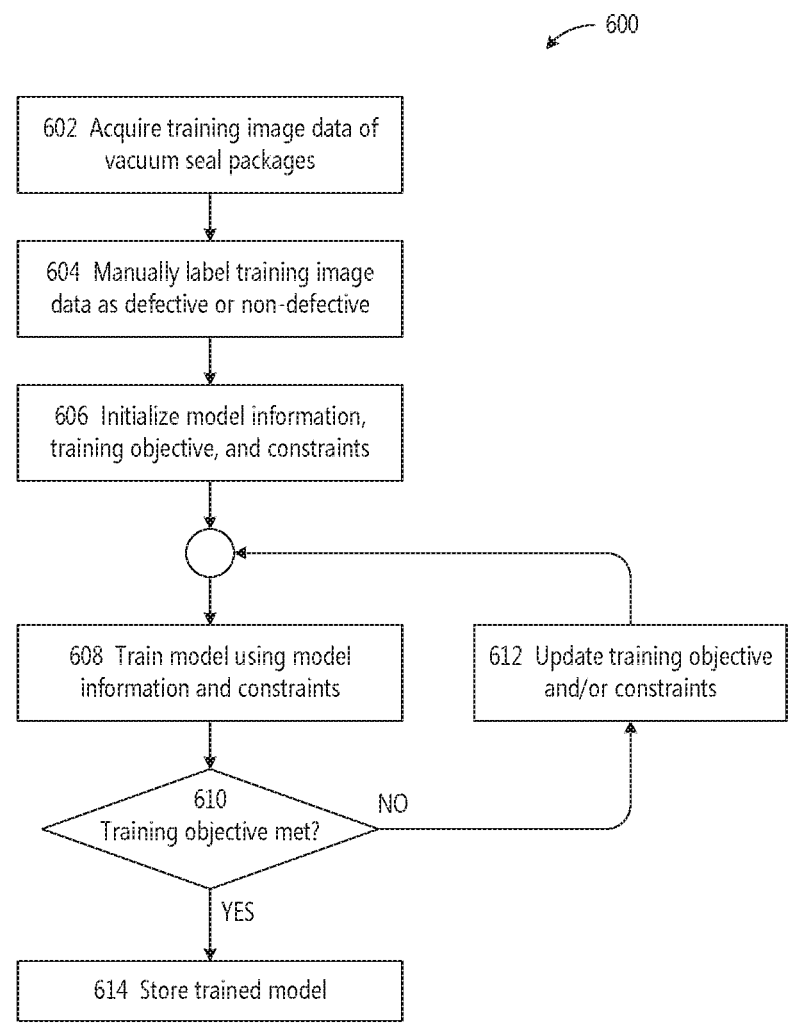
FIG. 6 depicts an embodiment of a method of developing a trained image classification model based on a number of parameters, in accordance with the embodiments described herein.

Depicted in FIG. 6 is an embodiment of a method 600 of developing a trained image classification model. At block 602, training image data is acquired for a number of vacuum seal packages. At block 604, the training image data is manually labelled as defective or non-defective. The manual labelling of the training image data may be done by a user entering an indication of defective or non-defective for each of the vacuum seal packages represented in the training image data into a user interface input device of a computing device.

At block 606, model information, training objectives, and constraints are initialized. In some examples, model information includes a type of model to be used, such as a neural network, a number of input vectors, and the like. In some examples, training objectives can include a desired or expected performance of the trained model, such as an accuracy rate of greater than or equal to a predetermined rate (e.g., greater than or equal to one or more of 90%, 95%, 96%, 97%, 98%, or 99%). In some examples, constraints can include limitations of the trained model, such as a minimum number of layers of a neural network, a maximum number of layers of a neural network, a minimum weighting of input vectors, a maximum weighting of input vectors, or any other constraints of a trained model. At block 608, the model can be trained using the model information and the model constraints. In some embodiments, the training image data is separated into two subsets—a training subset and a validation subset—and the training of the model at block 608 includes training the model using the training subset of the image data.

At block 610, a determination is made whether the training objective is met. In some embodiments, the determination at block 610 is made by comparing the results of the trained model to the training objective initialized at block 606. In some embodiments, where the training image data is separated into the training subset and the validation subset, the determination at block 610 includes testing the model trained at block 608 using the validation subset of the image data. If, at block 610, a determination is made that the training objective is not met, then the method 600 proceeds to block 612 where the training objective and/or the constraints are updated. After the training objective and/or the constraints are updated at block 612, the method 600 returns to block 608 where the model is trained using the updated training objective and/or constraints. If, at block 610, a determination is made that the training objective is met, then the method 600 proceeds to block 614 where the trained model is stored. Storing the trained model may include storing the trained model in one or more memories in a computing device (e.g., a local computing device, a remote computing device, etc.).

Figure 7:
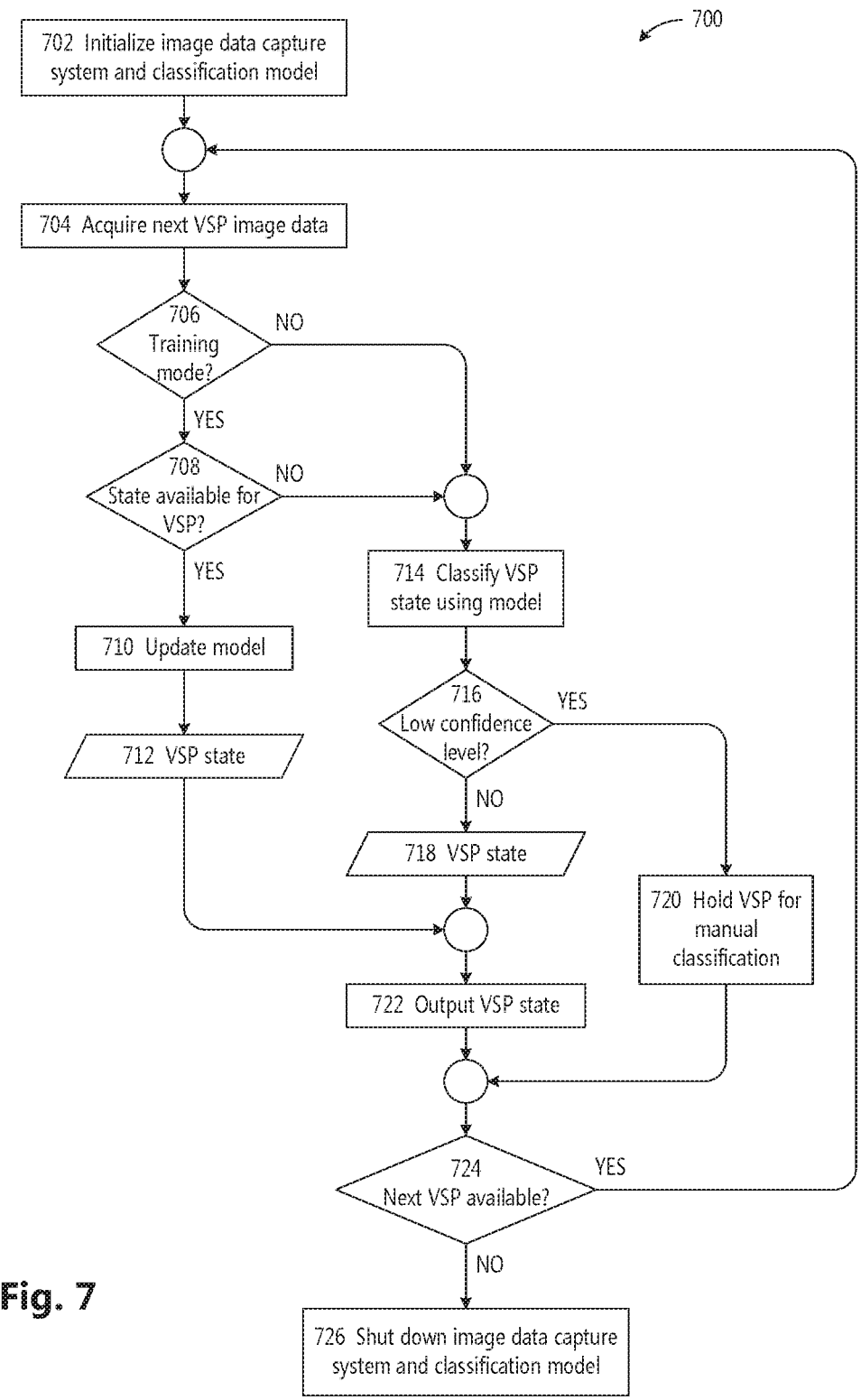
FIG. 7 depicts an embodiment of a method for an image classification system to both train a model to classify states of vacuum seal packages and apply the trained model to classify states of vacuum seal packages, in accordance with the embodiments described herein.

In some embodiments, an image classification system may be used both to train a model to classify states of vacuum seal packages and to apply the trained model to classify states of vacuum seal packages. Depicted in FIG. 7 is an embodiment of a method 700 for an image classification system to both train a model to classify states of vacuum seal packages and apply the trained model to classify states of vacuum seal packages. In some embodiments, the image classification system includes an image sensor system and a computing device (e.g., the image sensor system 302 and the computing device 310 of the image classification system 300). In those embodiments, the model may operate on the computing device while the image sensor system obtains image data of vacuum seal packages either for training or applying the model.

At block 702, the image classification system and the classification model are initialized. In some embodiments, initialization of the image classification system includes initializing a computing device and initializing an image sensor system, and initialization of the classification model includes loading launching software that includes the classification model on the computing system. At block 704, the image data of a vacuum seal package is acquired. In some embodiments, the image sensor system acquires the image data of the vacuum seal package and provides the image data to the computing system. At block 706, a determination is made whether the classification model is in training mode. The determination may be made by the software operating on the computing system that includes the classification model.

If, at block 706, a determination is made that the classification model is in training mode, then the model passes to block 708, where a determination is made if a state is available for the vacuum seal package. A state may be available for a vacuum seal package when a user manually enters a state for the vacuum seal package into a computing device. If, at block 708, a determination is made that a state is available, then the method proceeds to block 710. At block 710, the classification model is updated based on the image data and the state for the vacuum seal package. Updating the classification model can include any of the methods described herein for training and/or developing classification models. At this point, a vacuum seal package state (e.g., the manually-entered state) is available, as shown in block 712. However, if, at block 706, a determination is made that the classification model is not in training mode or if, at block 708, a determination is made that a state is not available, then the method proceeds to block 714.

At block 714, the classification model classifies a state of the vacuum seal package. In some embodiments, the state of a vacuum seal package classified by the classification model includes a determination of whether the vacuum seal package is defective, is non-defective, or has a particular defect, and an indication of a degree of certainty as to whether the vacuum seal package is defective, is non-defective, or has a particular defect. At block 716, a determination is made whether a confidence level of the classified state is low. In some embodiments, the confidence level is a percentage representing the degree of certainty that the classified state of the vacuum seal package is accurate and confidence level is low if the degree of certainty is below a predetermined percentage of an acceptable degree of certainty. For example, if the acceptable degree of certainty is 90%, then the classified state of the vacuum seal package is deemed to be low if the degree of certainty of the classified state is below 90%. If, at block 716, the confidence level is determined to not be low, then the vacuum seal package state has been determined, as shown at block 718. However, if at block 716, the confidence level is determined to be low, then the method proceeds to block 720 where the vacuum seal package is set aside for manual classification (e.g., classification by a user after visual inspection or physical testing).

If a state of the vacuum seal package is available, either at block 712 or at block 718, then the method proceeds to block 722. At block 722, the state of the vacuum seal package is output. In some embodiments, outputting the state of the vacuum seal package includes one or more of displaying the state of the vacuum seal package on a user interface output device, communicating the state of the vacuum seal package via a communication interface to one or more external devices, or storing the state of the vacuum seal package in a database. In some embodiments, the state of the vacuum seal package includes one or more of an indication of whether the vacuum seal package is defective, is non-defective, or has a particular defect, or a degree of certainty of whether the vacuum seal package is defective, is non-defective, or has a particular defect.

Whether state of the vacuum seal package is output at block 722 or the vacuum seal package is held for manual classification at block 720, the method 700 then proceeds to block 724. At block 724, a determination is made whether another vacuum seal package is available. In some embodiments, the determination at block 724 can be based on whether another vacuum seal package is detected on a transportation system (e.g., whether the presence detector system 126 detects another vacuum seal package on the transportation system 102). In some embodiments, the determination at block 724 can be based on whether a user inputs an indication whether another vacuum seal package is available. If, at block 724, a determination is made that another vacuum seal package is not available, then, at block 726, the image data capture system and the classification model are shut down. However, if, at block 724, a determination is made that another vacuum seal package is available, then the method 700 loops back to block 704 where image data is acquired of the next vacuum seal package and the method 700 proceeds from block 704 as described above for the next vacuum seal package.

Figure 8:
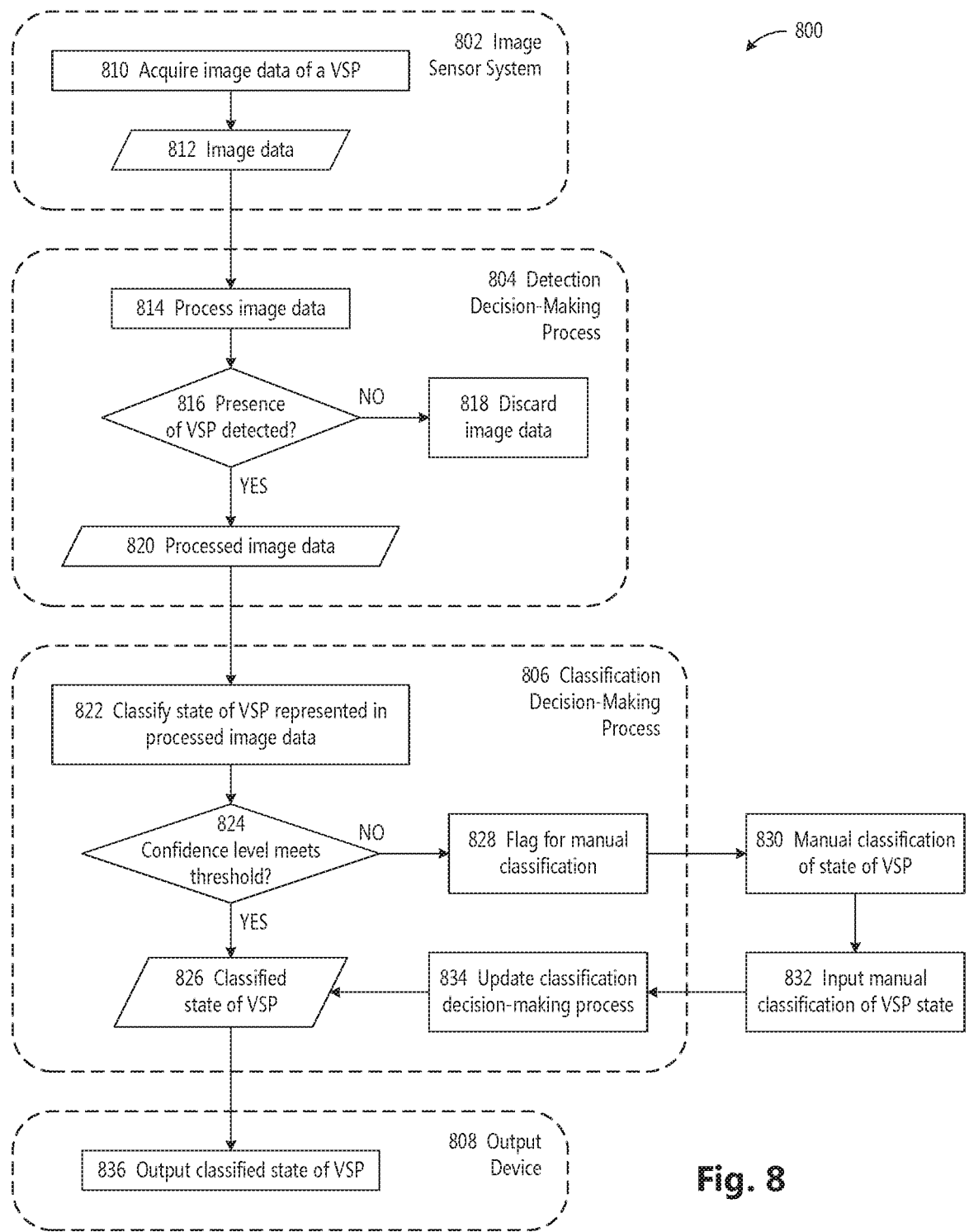
FIG. 8 depicts an embodiment of a method of classifying a state of a vacuum seal package, in accordance with the embodiments described herein.

As discussed above, a trained model to classify states of vacuum seal packages from image data may include one decision-making process, such as a decision tree or a neural network. In some embodiments, a trained model to classify states of vacuum seal packages from image data may include more than one decision-making process. Depicted in FIG. 8 is an embodiment of a method 800 of classifying a state of a vacuum seal package. In the depicted embodiment, the method 800 is performed in part by an image sensor system 802, a detection decision-making process 804, a classification decision-making process 806, and an output device 808. At block 810, the image sensor system acquires image data of a vacuum seal package. In some embodiments, the image sensor system 802 may acquire the image data as the vacuum seal package is being transported by a transport system. After the image data is acquired at block 810, the image sensor system has image data 812 that can be communicated to the detection decision-making process 804. In some embodiments, the detection decision-making process 804 is a software-based decision-making process operating on one or more computing devices.

At block 814, the detection decision-making process 804 processes the image data received from the image sensor system 802. In some embodiments, the processing of the image data at block 814 is performed by a trained model that has been trained to detect a region of interest associated with a vacuum seal package in image data. In some embodiments, the processing of the image data at block 814 includes one or more of cropping an image in the image data around a detected vacuum seal package in the image, selecting a frame or a subset of frames from a video in the image data, identifying irrelevant pixels from an image in the image data and replacing the irrelevant pixels with the least significant values of the image data. In some embodiments, the processing of the image data produces a single image having a rectangular shape with the identified vacuum seal package substantially centered in the image and the pixels deemed to be irrelevant being replaced with the least significant values. In some embodiments, the processing of the image data can include masking a portion of an image, where areas of the image outside of a region of interest (e.g., outside of a vacuum seal package) are replaced with low value data (e.g., the pixels are all changed to black) to reduce the amount of processing to classify the state of the vacuum seal package and reduce the likelihood of error when classifying the state of the vacuum seal package.

In one particular embodiment of processing image data, a custom boundary is constructed around a representation of a vacuum seal package in the image data. A bounding box encompassing the vacuum seal package is also constructed in the custom boundary. The processing also includes cropping the bounding box from the entire image data. One advantage of cropping the image data based on the custom boundary is that the later classification of the state of the vacuum seal package may be limited to areas of interest without the need to inspect areas of the image data that are not of interest. This may, in turn, increase the confidence level of classification and therefore overall accuracy of the classification. In some embodiments, where the detection decision-making process 804 is a multilayer neural network, creating the bounding box around the custom boundary simplifies compatibility requirements between the image data and the first layer of the neural network. Additionally, cropping the image data results in a portion of the image data being processed for classification, rather than the entire image data, which reduces the processing time for classification. In some embodiments, the custom boundary may help in generating a numerical value for one or more of the area of the vacuum seal package, its centroid, or its orientation.

At block 816, a determination is made whether the presence of a vacuum seal package is detected in the image data. In some embodiments, the determination made at block 816 is a part of the processing of the image data at block 816. In some embodiments, the determination of whether vacuum seal package is detected at block 816 is a separate process from the processing of the image data at block 816. If, at block 816, a determination is made that the presence of a vacuum seal package is not detected, then the method 800 proceeds to block 818 where the image data is discarded (e.g., deleted) and the method 800 ends. However, if, at block 816, a determination is made that the presence of a vacuum seal package is detected, then the processed image data represented at block 820 can be communicated to the classification decision-making process 806. In some embodiments, the classification decision-making process 806 is a software-based decision-making process operating on one or more computing devices, which may be the same as or different from the one or more computing devices on which the detection decision-making process 804 operates. In some embodiments, processing the image data at block 814 to obtain the processed image data, as shown at block 820, prior to classifying a state of the vacuum seal package represented in the data increases the accuracy of the later-performed classification by the classification decision-making process 806.

At block 822, the classification decision-making process 806 classifies the processed image data received from the detection decision-making process 804. In some embodiments, the classification of the image data at block 822 is performed by a trained model that has been trained to classify a state of vacuum seal packages represented in processed image data. In some embodiments, the classification of the state of the vacuum seal package represented in the processed image data at block 822 includes a determination of whether the vacuum seal package is defective, is non-defective, or has a particular defect. In some embodiments, the classification of the state of the vacuum seal package represented in the processed image data at block 822 includes a determination of whether the vacuum seal package is defective, is non-defective, or has a particular defect, and an indication of a degree of certainty as to whether the vacuum seal package is defective, is non-defective, or has a particular defect.

At block 824, a determination is made whether a confidence level of the classified state is low. In some embodiments, the confidence level is a percentage representing the degree of certainty that the classified state of the vacuum seal package is accurate and the confidence level is low if the degree of certainty is below a predetermined percentage of an acceptable degree of certainty. For example, if the acceptable degree of certainty is 90%, then the classified state of the vacuum seal package is deemed to be low if the degree of certainty of the classified state is below 90%. If, at block 824, the confidence level is determined to not be low, then the vacuum seal package state has been determined, as shown at block 826. However, if at block 824, the confidence level is determined to be low, then the method proceeds to block 828 where the vacuum seal package and/or the image data is flagged for manual classification.

At block 830, a state of the vacuum seal package is manually classified outside of the classification decision-making process. In some embodiments, the vacuum seal package is manually classified by a user after visual inspection or physical testing of the vacuum seal package. At block 832, the user inputs the manually-classified state of the vacuum seal package to the classification decision-making process 806. At block 834, the classification decision-making process 806 is updated. In embodiments where the classification decision-making process 806 is a trained model, updating the classification decision-making process 806 includes further training the trained model based on the manual classification. After updating the classification decision-making process 806, the method 700 returns to block 826 where the classified state of the vacuum seal package is the manually-classified state of the vacuum seal package.

After the classified state of the vacuum seal package, as represented at block 826, is classified or obtained by the classification decision-making process 806, the classification decision-making process 806 sends the classified stated of the vacuum seal package to the output device 808. In the embodiments where the classification decision-making process 806 is software operating on one or more computing devices, the output device 808 can be a user interface output device. In some embodiments, the outputting the classified state of the vacuum seal package at block 836 includes one or more of outputting the classified state of the vacuum seal package to a user via a user interface (e.g., a monitor, a touchscreen, etc.), communicating the classified state of the vacuum seal package to an external device via a communications interface, or locally storing the classified state of the vacuum seal package in a database.

In any of the embodiments disclosed herein, the image data received for any one vacuum seal package may include multiple forms of image data about the same vacuum seal package. For example, image data about a vacuum seal package may include two images in the visible light range of the same vacuum seal package. These multiple different forms of image data for the same vacuum seal package may be passed through a trained model separately. If the trained model returns the same classified state for the vacuum seal package using the two different forms of image data, then the confidence level of the classification for that vacuum seal package can be increased significantly. In one example, if the trained model classified one of the images as having a vacuum seal package with an imperfect seal at a 98% confidence level and classified the other image as having a vacuum seal package with an imperfect seal at a 96% confidence level, then the confidence level that the vacuum seal package has an imperfect seal may be greater than 99%. In another example, if the trained model classified one of the images as having a non-defective vacuum seal package at a 60% confidence level and classified the other image as having a non-defective vacuum seal package at an 70% confidence level, then the confidence level that the vacuum seal package is non-defective may be 88%. Even though the confidence level using two images may be significantly higher than either of the images alone, the combined confidence level from two images (e.g., 88%) may still be below a predetermined percentage of an acceptable degree of certainty (e.g., 95%), which may cause the vacuum seal package to be flagged for manual classification. It will be apparent that the number of multiple forms of image data is not limited to two, but could be any number of forms of image data.

Figure 9:
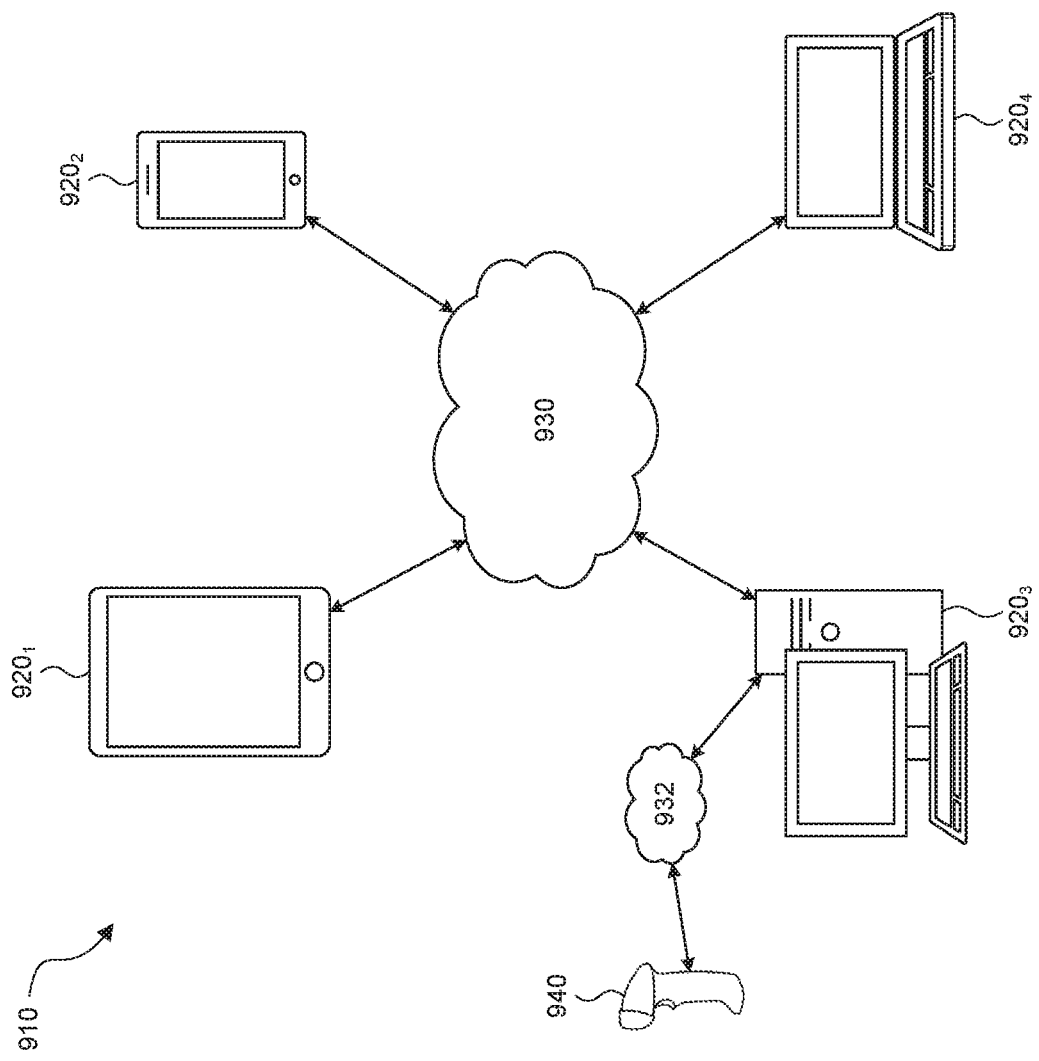
FIG. 9 depicts an example embodiment of a system that may be used to implement some or all of the embodiments described herein.

FIG. 9 depicts an example embodiment of a system 910 that may be used to implement some or all of the embodiments described herein. In the depicted embodiment, the system 910 includes computing devices 920₁, 920₂, 920₃, and 920₄ (collectively computing devices 920). In the depicted embodiment, the computing device 920₁ is a tablet, the computing device 920₂ is a mobile phone, the computing device 920₃ is a desktop computer, and the computing device 920₄ is a laptop computer. In other embodiments, the computing devices 920 include one or more of a desktop computer, a mobile phone, a tablet, a phablet, a notebook computer, a laptop computer, a distributed system, a gaming console (e.g., Xbox, Play Station, Wii), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof.

The computing devices 920 are communicatively coupled to each other via one or more networks 930 and 932. Each of the networks 930 and 932 may include one or more wired or wireless networks (e.g., a 3G network, the Internet, an internal network, a proprietary network, a secured network). The computing devices 920 are capable of communicating with each other and/or any other computing devices via one or more wired or wireless networks. While the particular system 910 in FIG. 9 depicts that the computing devices 920 communicatively coupled via the network 930 include four computing devices, any number of computing devices may be communicatively coupled via the network 930.

In the depicted embodiment, the computing device 920₃ is communicatively coupled with a peripheral device 940 via the network 932. In the depicted embodiment, the peripheral device 940 is a scanner, such as a barcode scanner, an optical scanner, a computer vision device, and the like. In some embodiments, the network 932 is a wired network (e.g., a direct wired connection between the peripheral device 940 and the computing device 920₃), a wireless network (e.g., a Bluetooth connection or a WiFi connection), or a combination of wired and wireless networks (e.g., a Bluetooth connection between the peripheral device 940 and a cradle of the peripheral device 940 and a wired connection between the peripheral device 940 and the computing device 920₃). In some embodiments, the peripheral device 940 is itself a computing device (sometimes called a "smart" device). In other embodiments, the peripheral device 940 is not a computing device (sometimes called a "dumb" device).

Depicted in FIG. 10 is a block diagram of an embodiment of a computing device 1000. Any of the computing devices 920 and/or any other computing device described herein may include some or all of the components and features of the computing device 1000. In some embodiments, the computing device 1000 is one or more of a desktop computer, a mobile phone, a tablet, a phablet, a notebook computer, a laptop computer, a distributed system, a gaming console (e.g., an Xbox, a Play Station, a Wii), a watch, a pair of glasses, a key fob, a radio frequency identification (RFID) tag, an ear piece, a scanner, a television, a dongle, a camera, a wristband, a wearable item, a kiosk, an input terminal, a server, a server network, a blade, a gateway, a switch, a processing device, a processing entity, a set-top box, a relay, a router, a network access point, a base station, any other device configured to perform the functions, operations, and/or processes described herein, or any combination thereof. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

In the depicted embodiment, the computing device 1000 includes a processing element 1005, memory 1010, a user interface 1015, and a communications interface 1020. The processing element 1005, memory 1010, a user interface 1015, and a communications interface 1020 are capable of communicating via a communication bus 1025 by reading data from and/or writing data to the communication bus 1025. The computing device 1000 may include other components that are capable of communicating via the communication bus 1025. In other embodiments, the computing device does not include the communication bus 1025 and the components of the computing device 1000 are capable of communicating with each other in some other way.

The processing element 1005 (also referred to as one or more processors, processing circuitry, and/or similar terms used herein) is capable of performing operations on some external data source. For example, the processing element may perform operations on data in the memory 1010, data receives via the user interface 1015, and/or data received via the communications interface 1020. As will be understood, the processing element 1005 may be embodied in a number of different ways. In some embodiments, the processing element 1005 includes one or more complex programmable logic devices (CPLDs), microprocessors, multi-core processors, co processing entities, application-specific instruction-set processors (ASIPs), microcontrollers, controllers, integrated circuits, application specific integrated circuits (ASICs), field programmable gate arrays (FPGAs), programmable logic arrays (PLAs), hardware accelerators, any other circuitry, or any combination thereof. The term circuitry may refer to an entirely hardware embodiment or a combination of hardware and computer program products. In some embodiments, the processing element 1005 is configured for a particular use or configured to execute instructions stored in volatile or nonvolatile media or otherwise accessible to the processing element 1005. As such, whether configured by hardware or computer program products, or by a combination thereof, the processing element 1005 may be capable of performing steps or operations when configured accordingly.

The memory 1010 in the computing device 1000 is configured to store data, computer-executable instructions, and/or any other information. In some embodiments, the memory 1010 includes volatile memory (also referred to as volatile storage, volatile media, volatile memory circuitry, and the like), non-volatile memory (also referred to as non-volatile storage, non-volatile media, non-volatile memory circuitry, and the like), or some combination thereof.

In some embodiments, volatile memory includes one or more of random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, any other memory that requires power to store information, or any combination thereof.

In some embodiments, non-volatile memory includes one or more of hard disks, floppy disks, flexible disks, solid-state storage (SSS) (e.g., a solid state drive (SSD)), solid state cards (SSC), solid state modules (SSM), enterprise flash drives, magnetic tapes, any other non-transitory magnetic media, compact disc read only memory (CD ROM), compact disc-rewritable (CD-RW), digital versatile disc (DVD), Blu-ray disc (BD), any other non-transitory optical media, read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, Memory Sticks, conductive-bridging random access memory (CBRAM), phase-change random access memory (PRAM), ferroelectric random-access memory (FeRAM), non-volatile random access memory (NVRAM), magneto-resistive random access memory (MRAM), resistive random-access memory (RRAM), Silicon Oxide-Nitride-Oxide-Silicon memory (SONOS), floating junction gate random access memory (FJG RAM), Millipede memory, racetrack memory, any other memory that does not require power to store information, or any combination thereof.

In some embodiments, memory 1010 is capable of storing one or more of databases, database instances, database management systems, data, applications, programs, program modules, scripts, source code, object code, byte code, compiled code, interpreted code, machine code, executable instructions, or any other information. The term database, database instance, database management system, and/or similar terms used herein may refer to a collection of records or data that is stored in a computer-readable storage medium using one or more database models, such as a hierarchical database model, network model, relational model, entity relationship model, object model, document model, semantic model, graph model, or any other model.

The user interface 1015 of the computing device 1000 is in communication with one or more input or output devices that are capable of receiving inputs into and/or outputting any outputs from the computing device 1000. Embodiments of input devices include a keyboard, a mouse, a touchscreen display, a touch sensitive pad, a motion input device, movement input device, an audio input, a pointing device input, a joystick input, a keypad input, peripheral device 940, foot switch, and the like. Embodiments of output devices include an audio output device, a video output, a display device, a motion output device, a movement output device, a printing device, and the like. In some embodiments, the user interface 1015 includes hardware that is configured to communicate with one or more input devices and/or output devices via wired and/or wireless connections.

The communications interface 1020 is capable of communicating with various computing devices and/or networks. In some embodiments, the communications interface 1020 is capable of communicating data, content, and/or any other information, that can be transmitted, received, operated on, processed, displayed, stored, and the like. Communication via the communications interface 1020 may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, communication via the communications interface 1020 may be executed using a wireless data transmission protocol, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (WiFi), WiFi Direct, 802.16 (WiMAX), ultra wideband (UWB), infrared (IR) protocols, near field communication (NFC) protocols, Wibree, Bluetooth protocols, wireless universal serial bus (USB) protocols, or any other wireless protocol.

As will be appreciated by those skilled in the art, one or more components of the computing device 1000 may be located remotely from other components of the computing device 1000 components, such as in a distributed system. Furthermore, one or more of the components may be combined and additional components performing functions described herein may be included in the computing device 1000. Thus, the computing device 1000 can be adapted to accommodate a variety of needs and circumstances. The depicted and described architectures and descriptions are provided for exemplary purposes only and are not limiting to the various embodiments described herein.

Embodiments described herein may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

As should be appreciated, various embodiments of the embodiments described herein may also be implemented as methods, apparatus, systems, computing devices, and the like. As such, embodiments described herein may take the form of an apparatus, system, computing device, and the like executing instructions stored on a computer readable storage medium to perform certain steps or operations. Thus, embodiments described herein may be implemented entirely in hardware, entirely in a computer program product, or in an embodiment that comprises combination of computer program products and hardware performing certain steps or operations.

Embodiments described herein may be made with reference to block diagrams and flowchart illustrations. Thus, it should be understood that blocks of a block diagram and flowchart illustrations may be implemented in the form of a computer program product, in an entirely hardware embodiment, in a combination of hardware and computer program products, or in apparatus, systems, computing devices, and the like carrying out instructions, operations, or steps. Such instructions, operations, or steps may be stored on a computer readable storage medium for execution buy a processing element in a computing device. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A system comprising:
   a transportation system configured to transport vacuum seal packages, wherein each of the vacuum seal packages includes a food product;
   an image sensor system including an image data capture system, wherein the image data capture system is arranged to capture image data of individual vacuum seal packages as the vacuum seal packages are transported by the transportation system; and
   one or more computing devices communicatively coupled to the image sensor system and configured to receive the image data from the image sensor system;
   wherein the one or more computing devices include instructions that, in response to execution of the instructions by the one or more computing devices, cause the one or more computing devices to:
      classify a state of one or more of the vacuum seal packages based on the image data using a trained classification model, wherein the state of one or more of the vacuum seal packages includes an indication of whether the food product is fully enclosed in a generally air-free environment in one of the one or more of the vacuum seal packages, and
      output the state of the one or more of the vacuum seal packages after classification of the state of the one or more of the vacuum seal packages.

2. The system of claim 1, wherein the trained classification model includes a decision-making process configured to receive an input that includes the image data and to output an output that includes the state of the one or more of the vacuum seal packages.

3. The system of claim 2, wherein the decision-making process is a multilayer neural network, wherein the multilayer neural network includes an input layer comprising the input, an output layer comprising the output, and at least one hidden layer between the input layer and the output layer.

4. The system of claim 1, wherein the image sensor system further comprises a presence detector system configured to detect one of the vacuum seal packages on the transport system.

5. The system of claim 4, wherein:
   the image sensor system further comprises a controller;
   the controller is configured to receive a signal from the presence detector system indicating the detected one of the vacuum seal packages; and
   the controller is further configured to control a timing of the image sensor system during at least a portion of a time that the image sensor system obtains the image data of the detected one of the vacuum seal packages.

6. The system of claim 5, wherein the transportation system comprises a conveyor belt, and wherein the controller is further configured to control the timing of the image sensor system based in part on a speed of the conveyor belt.

7. The system of claim 1, wherein the classified state of the one or more of the vacuum seal packages includes an indication of whether the one or more of the vacuum seal packages is defective, is non-defective, or has a particular defect.

8. The system of claim 7, wherein the classified state of the one or more of the vacuum seal packages further includes a degree of certainty as to whether the vacuum seal package is defective, is non-defective, or has a particular defect.

9. The system of claim 1, wherein the one or more computing devices are configured to output the state of the one or more of the vacuum seal packages via by at least one of providing an indication of the state to a user interface output device, communicating the state via a communication interface to an external device, or storing the state in a local database.

10. A computer-readable medium having instructions embodied thereon, wherein the computer-readable medium is a non-transitory computer-readable medium, and wherein the instructions comprise instructions that, in response to execution by one or more computing devices, cause the one or more computing devices to:
   receive training image data, the training image data comprising image data about a plurality of first vacuum seal packages;
   receive labels associated with the plurality of first vacuum seal packages, wherein each of the labels includes a state of one of the plurality of first vacuum seal packages;
   develop a trained classification model based on the training image data and the received labels;
   receive image data representative of a second vacuum seal package;
   input the image data into the trained classification model, wherein the trained classification model is configured to classify a state of the second vacuum seal package based on the image data, wherein the state of the second vacuum seal package includes an indication of whether the food product is fully enclosed in a generally air-free environment in the second vacuum seal package; and
receive the state of the second vacuum seal package from the trained classification model.

11. The computer-readable medium of claim 10, wherein the state of the second vacuum seal package includes an indication of whether the second vacuum seal package is defective, is non-defective, or has a particular defect.

12. The computer-readable medium of claim 11, wherein the state of the second vacuum seal package further includes a degree of certainty as to whether the second vacuum seal package is defective, is non-defective, or has a particular defect.

13. The computer-readable medium of claim 12, wherein the instructions further comprise instructions that, in response to execution by the one or more computing devices, further cause the one or more computing devices to:
  determine, based on the degree of certainty, whether a confidence level of the state of the second vacuum seal package is low; and
  in response to determining that the confidence level of the state of the second vacuum seal package is low, flag the second vacuum seal package for manual classification.

14. The computer-readable medium of claim 13, wherein the instructions further comprise instructions that, in response to execution by the one or more computing devices, further cause the one or more computing devices to:
  receive a user input of a manual classification of the second vacuum seal package; and
  further develop the trained classification model based on the image data and the manual classification of the second vacuum seal package.

15. The computer-readable medium of claim 10, wherein the trained classification model includes a detection decision-making process and a classification decision-making process.

16. The computer-readable medium of claim 15, wherein the detection decision-making process is configured to process the image data to produce processed image data.

17. The computer-readable medium of claim 16, wherein the detection decision-making process is configured to perform at least one of:
  process the image data to produce processed image data at least by cropping an image in the image data so that the second vacuum seal package remains in the cropped image;
  detect a presence of the second vacuum seal package in the image data; or
  classify the state of the second vacuum seal package based on the processed image data.

18. The computer-readable medium of claim 10, wherein the instruction that cause the one or more computing devices to develop a trained classification model include instructions that, in response to execution by the one or more computing devices, cause the one or more computing devices to:
  train the classification model for a plurality of learning parameters; and
  determine one or more model parameters based on the plurality of learning parameters.

19. The computer-readable medium of claim 18, wherein the instruction that cause the one or more computing devices to develop a trained classification model further include instructions that, in response to execution by the one or more computing devices, cause the one or more computing devices to:
  create the trained classification model based on the one or more model parameters.

20. The computer-readable medium of claim 10, wherein:
  the image data representative of the second vacuum seal package includes a plurality of forms of image data;
  the plurality of forms of image data includes at least two images of the second vacuum seal package; and
  the trained classification model is configured to classify the state of the second vacuum seal package based on the image data in part by separately classifying a state of each of the at least two images of the second vacuum seal package.

* * * * *